United States Patent
Lim et al.

(10) Patent No.: US 10,505,413 B2
(45) Date of Patent: Dec. 10, 2019

(54) INTERIOR PERMANENT MAGNET MOTOR INCLUDING MAGNETS ARRANGED TO BE PARTITIONED FROM BARRIERS

(71) Applicant: SAMSUNG ELECTRONICS CO., LTD., Suwon-si, Gyeonggi-do (KR)

(72) Inventors: Seong-taek Lim, Suwon-si (KR); Sung-il Kim, Seoul (KR); Hyung-chul Lee, Gunpo-si (KR); Jun-seok Kim, Yongin-si (KR); Tae-ho Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 263 days.

(21) Appl. No.: 15/468,789

(22) Filed: Mar. 24, 2017

(65) Prior Publication Data
US 2017/0294813 A1  Oct. 12, 2017

(30) Foreign Application Priority Data

Apr. 12, 2016 (KR) .................. 10-2016-0044672

(51) Int. Cl.
*H02K 1/27* (2006.01)
*H02K 1/14* (2006.01)
(Continued)

(52) U.S. Cl.
CPC ........... *H02K 1/2706* (2013.01); *H02K 1/146* (2013.01); *H02K 1/2766* (2013.01); *H02K 3/325* (2013.01); *H02K 21/145* (2013.01)

(58) Field of Classification Search
CPC .... H02K 1/2766; H02K 1/2706; H02K 1/146; H02K 3/325; H02K 21/12; H02K 21/14; H02K 2213/03
(Continued)

(56) References Cited

U.S. PATENT DOCUMENTS

2007/0126304 A1  6/2007  Ito et al.
2011/0084567 A1*  4/2011  Ichiyama ............. H02K 1/2746
                                                               310/181
(Continued)

FOREIGN PATENT DOCUMENTS

EP    2360814       8/2011
JP    3607137 B2    1/2005
(Continued)

OTHER PUBLICATIONS

Extended European Search Report dated Oct. 11, 2017 in European Patent Application No. 17165607.7.

*Primary Examiner* — Michael Andrews
(74) *Attorney, Agent, or Firm* — Staas & Halsey LLP

(57) ABSTRACT

An interior permanent magnet motor includes a stator comprising a hollow and a plurality of coils provided around the hollow; and a rotor rotatably disposed in the hollow of the stator and comprising a plurality of permanent magnets therein. Each of the plurality of permanent magnets of the rotor comprises a central permanent magnet; a pair of side permanent magnets provided at opposite ends of the central permanent magnet to be inclined toward an outer circumferential surface of the rotor; and a pair of bathers provided between the central permanent magnet and the pair of side permanent magnets, a thickness of each of the pair of bathers is equal to or greater than a thickness of the central permanent magnet. The thickness of the central permanent magnet is greater than a thickness of each of the pair of side permanent magnets.

18 Claims, 17 Drawing Sheets

(51) Int. Cl.
*H02K 3/32* (2006.01)
*H02K 21/14* (2006.01)

(58) Field of Classification Search
USPC .......................... 310/156.11, 156.53, 156.57
See application file for complete search history.

(56) References Cited

U.S. PATENT DOCUMENTS

| | | | |
|---|---|---|---|
| 2012/0091848 A1* | 4/2012 | Sakai | H02K 1/2766 |
| | | | 310/156.43 |
| 2014/0159529 A1* | 6/2014 | Bilgin | H02K 1/278 |
| | | | 310/156.01 |
| 2015/0077034 A1 | 3/2015 | Kaneko et al. | |

FOREIGN PATENT DOCUMENTS

| | | |
|---|---|---|
| JP | 2007-006657 A | 1/2007 |
| JP | 2013-51763 | 3/2013 |
| JP | 5355055 B2 | 11/2013 |
| KR | 10-2014-0068677 A | 6/2014 |
| KR | 10-2014-0143799 A | 12/2014 |

* cited by examiner

INTERIOR PERMANENT MAGNET MOTOR INCLUDING MAGNETS ARRANGED TO BE PARTITIONED FROM BARRIERS

CROSS-REFERENCE TO RELATED APPLICATIONS

This application claims priority from Korean Patent Application No. 10-2016-0044672 filed Apr. 12, 2016 in the Korean Intellectual Property Office, the disclosure of which is incorporated herein by reference in its entirety.

BACKGROUND

1. Field

The present disclosure relates to an interior permanent magnet motor. More particularly, the present disclosure relates to an interior permanent magnet motor whose performance may be improved by improving saliency ratio.

2. Description of the Related Art

Generally, since a permanent magnet synchronous motor (PMSM) or a permanent magnet motor (PMM) has high output and high efficiency characteristics, it is widely used in industrial applications.

Such a permanent magnet motor may be classified into two types in accordance with a position where permanent magnets are disposed in a rotor, that is, a surface permanent magnet motor (SPMM) in which permanent magnets are attached to a surface of the rotor and an interior permanent magnet motor (IPMM) in which the permanent magnets are embedded inside the rotor.

The conventional interior permanent magnet motor has focused on only increasing the efficiency at maximum power without considering the most frequently operating range. To this end, a plurality of permanent magnets that are formed in a V-shape or U-shape and have a constant thickness capable of maximizing the cross-sectional area of the permanent magnets in order to maximize the magnetic flux by the permanent magnets in a limited space of the rotor for reducing copper loss have been used. However, this structure decreases the operation range by generating a large back electromotive force as well as reduces saliency ratio and increases the iron loss by deepening the magnetic flux saturation of the stator core.

Accordingly, it is required to develop an interior permanent magnet motor having improved performance such as improvement of low speed efficiency, reduction of input current, and enlargement of operation range by improving the saliency ratio.

SUMMARY

The present disclosure has been developed in order to overcome the above drawbacks and other problems associated with the conventional arrangement. An aspect of the present disclosure relates to an interior permanent magnet motor having improved performance such as improvement of low speed efficiency, reduction of input current, and enlargement of operation range by improving saliency ratio.

According to an aspect of the present disclosure, an interior permanent magnet motor may include a stator comprising a hollow and a plurality of coils provided around the hollow; and a rotor rotatably disposed in the hollow of the stator, the rotor comprising a plurality of permanent magnets therein, wherein each of the plurality of permanent magnets of the rotor comprises a central permanent magnet; a pair of side permanent magnets provided at opposite ends of the central permanent magnet to be inclined toward an outer circumferential surface of the rotor; and a pair of bathers provided between the central permanent magnet and the pair of side permanent magnets, a thickness of each of the pair of bathers is equal to or greater than a thickness of the central permanent magnet, and wherein the thickness of the central permanent magnet is greater than a thickness of each of the pair of side permanent magnets.

A distance between two adjacent coils of the plurality of coils of the stator may be greater than a distance between two points which are spaced farthest apart in two adjacent side permanent magnets of the pair of side permanent magnets of each of two adjacent permanent magnets of the plurality of permanent magnets.

Each of the plurality of permanent magnets is formed to satisfy a following condition, $$0.5 \times Lm \leq Lc \leq Lm$$

wherein Lc represents a shortest distance between the pair of side permanent magnets, and Lm represents a length of each of the pair of side permanent magnets.

The central permanent magnet may include at least two central permanent magnets that are perpendicular to a d-axis direction and parallel to each other.

Side surfaces of two adjacent coils of the plurality of coils may be parallel to each other.

According to another aspect of the present disclosure, an interior permanent magnet motor may include a stator comprising a hollow and a plurality of coils provided around the hollow; and a rotor rotatably disposed in the hollow of the stator, the rotor comprising a plurality of permanent magnets therein, wherein each of the plurality of permanent magnets of the rotor comprises a central permanent magnet; a pair of side permanent magnets provided at opposite ends of the central permanent magnet to be inclined toward an outer circumferential surface of the rotor; and a pair of bathers provided between the central permanent magnet and the pair of side permanent magnets, and wherein a distance between two adjacent coils of the plurality of coils of the stator is greater than a distance between two points which are spaced farthest apart in a circumferential direction of the rotor in two adjacent side permanent magnets of the pair of side permanent magnets of each of two adjacent permanent magnets of the plurality of permanent magnets.

A thickness of the central permanent magnet may be thicker than a thickness of each of the pair of side permanent magnets.

A thickness of each of the pair of bathers may be equal to or thicker than the thickness of the central permanent magnet.

Other objects, advantages and salient features of the present disclosure will become apparent from the following detailed description, which, taken in conjunction with the annexed drawings, discloses preferred embodiments.

BRIEF DESCRIPTION OF THE DRAWINGS

These and/or other aspects and advantages of the present disclosure will become apparent and more readily appreciated from the following description of the embodiments, taken in conjunction with the accompanying drawings of which:}

Throughout the drawings, like reference numerals will be understood to refer to like parts, components and structures.

DETAILED DESCRIPTION OF THE EXEMPLARY EMBODIMENTS

Hereinafter, certain exemplary embodiments of the present disclosure will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

The terms "first", "second", etc. may be used to describe diverse components, but the components are not limited by the terms. The terms are only used to distinguish one component from the others.

The terms used in the present application are only used to describe the exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Figure 1:
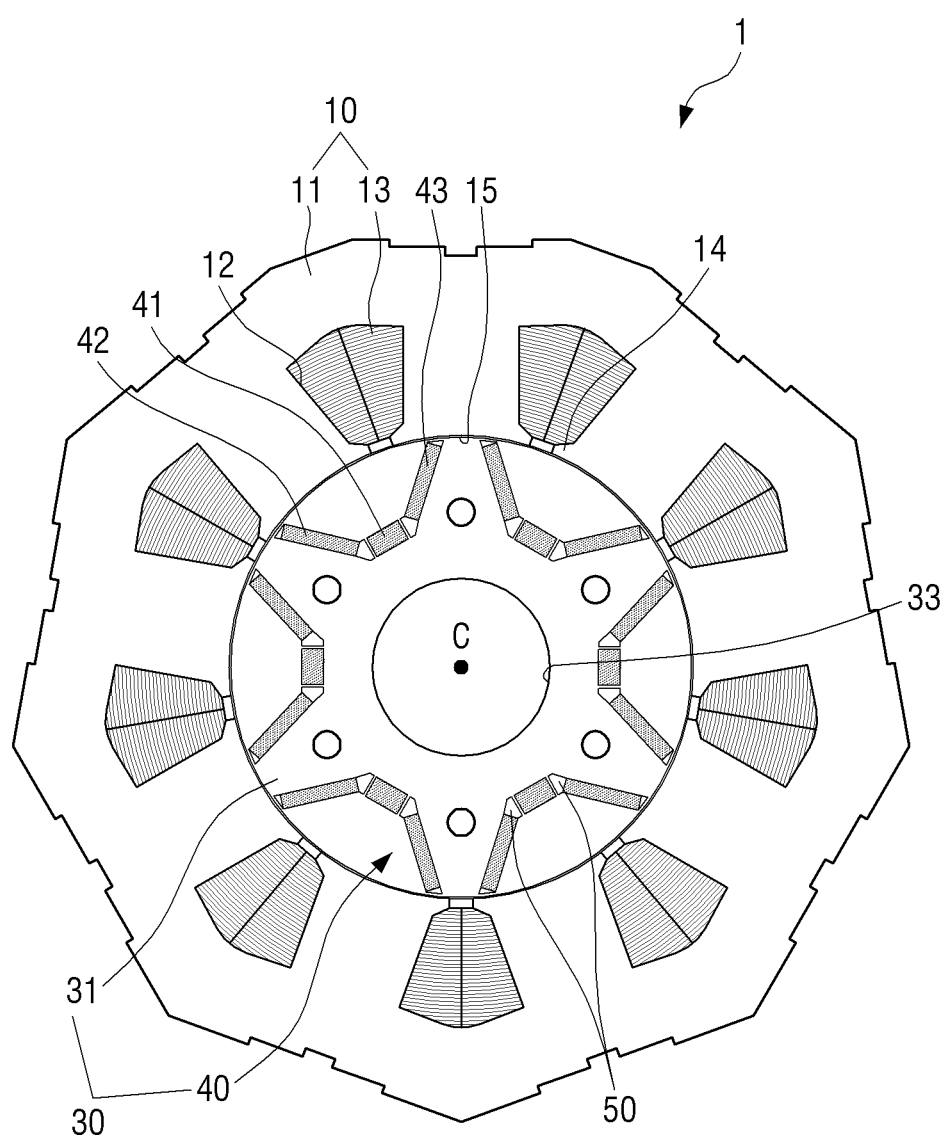
FIG. 1 is a cross-sectional view illustrating an interior permanent magnet motor according to an embodiment of the present disclosure.
Figure 2:
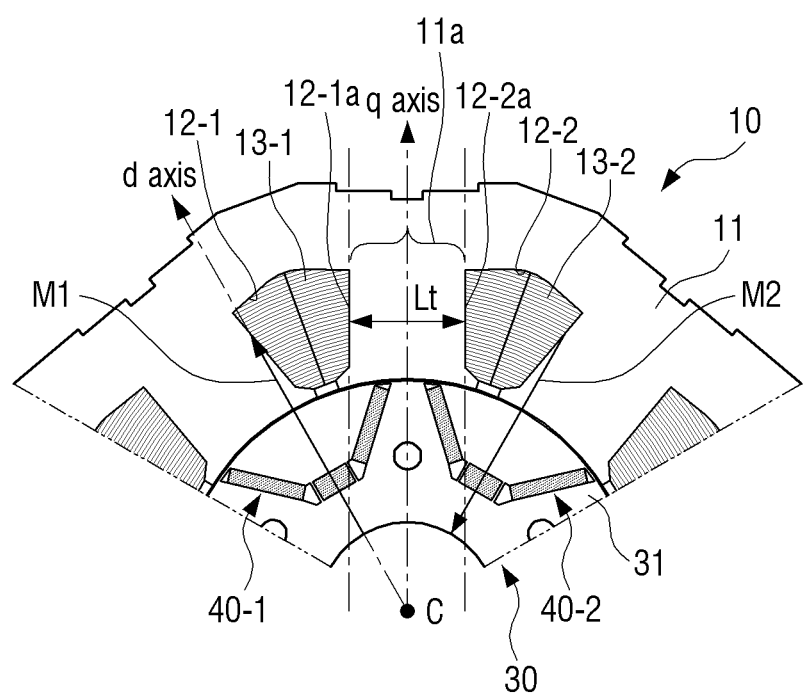
FIG. 2 is a partial cross-sectional view of the interior permanent magnet motor of FIG. 1.
Figure 3:
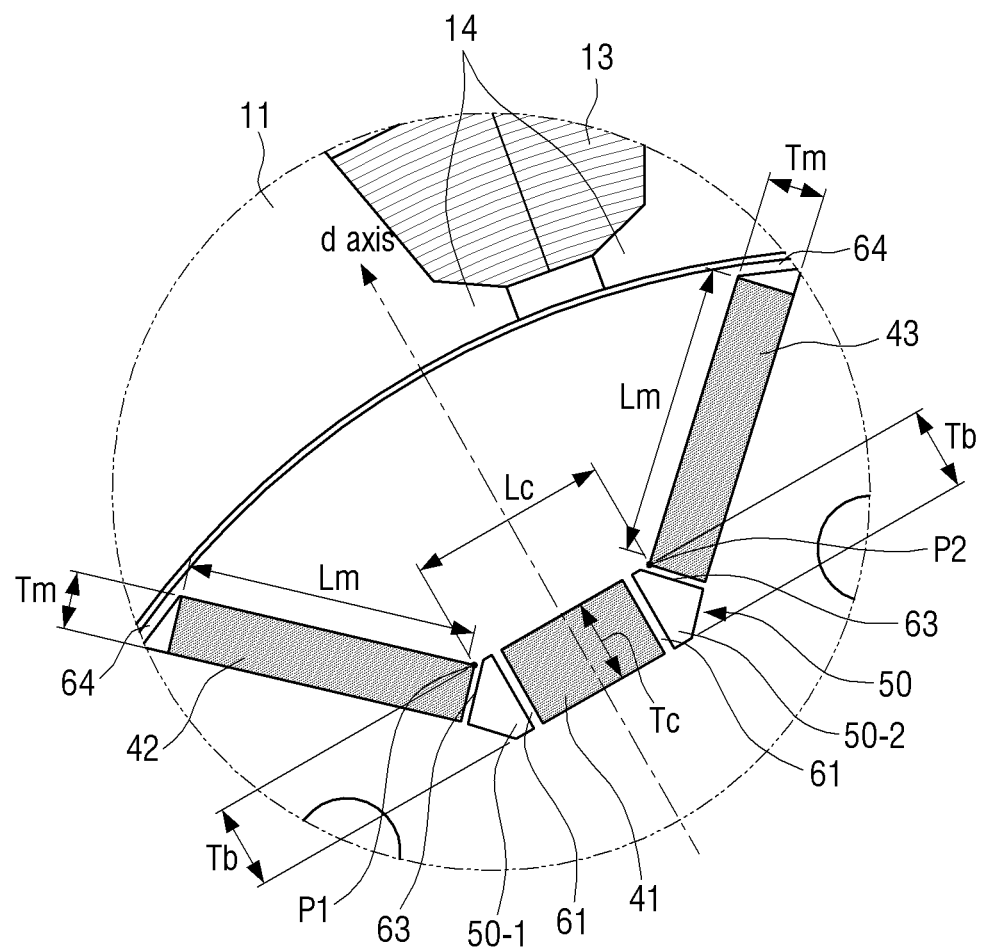
FIG. 3 is a partial enlarged cross-sectional view illustrating a permanent magnet of FIG. 2.

FIG. 1 is a cross-sectional view illustrating an interior permanent magnet motor according to an embodiment of the present disclosure. FIG. 2 is a partial cross-sectional view of the interior permanent magnet motor of FIG. 1, and FIG. 3 is a partial enlarged cross-sectional view illustrating a permanent magnet of FIG. 2.

Referring to FIGS. 1 and 2, an interior permanent magnet motor 1 according to an embodiment of the present disclosure may include a stator 10 and a rotor 30.

The stator 10 may include a stator core 11 and a plurality of coils 13. A cylindrical hollow 15 is formed inside the stator core 11, and a plurality of coil grooves 12 are provided around the hollow 15 at regular intervals. Coils 13 are provided in the plurality of coils grooves 12, respectively. Each of the coil grooves 12 is provided with a pair of fixing protrusions 14 for fixing the coil 13 thereto. The stator core 11 may be formed of a conductive material such as iron.

As illustrated in FIG. 2, two adjacent coil grooves 12-1 and 12-2 of the plurality of coil grooves 12 may be formed such that two facing side surfaces 12-1a and 12-2a are parallel to each other. In this case, the side surfaces of the two coils 13-1 and 13-2 inserted in the two coil grooves 12 are also substantially parallel to each other. Accordingly, a portion 11a of the stator core 11 positioned between the two coil grooves 12-1 and 12-2 forms a tooth of a substantially rectangular shape projecting toward the center C of the stator 10. Therefore, a plurality of stator teeth 11a are formed by the plurality of coil grooves 12 formed in the stator core 11. At this time, the distance Lt between the two facing side surfaces 12-1a and 12-2a of the two coil grooves 12-1 and 12-2 may be referred to as a stator tooth width.

FIGS. 1 and 2 illustrate a case in which the side surfaces 12-1a and 12-2a of the two adjacent coil grooves 12-1 and 12-2 of the plurality of coil grooves 12 are formed parallel to each other so that the plurality of stator teeth 11a are formed in a rectangular shape; however, the shape of each of the plurality of coil grooves 12 is not limited thereto. The plurality of coil grooves 12 may be formed so that the side surfaces 12-1a and 12-2a of the two adjacent coil grooves 12-1 and 12-2 are inclined as illustrated in FIG. 4.

Figure 4:
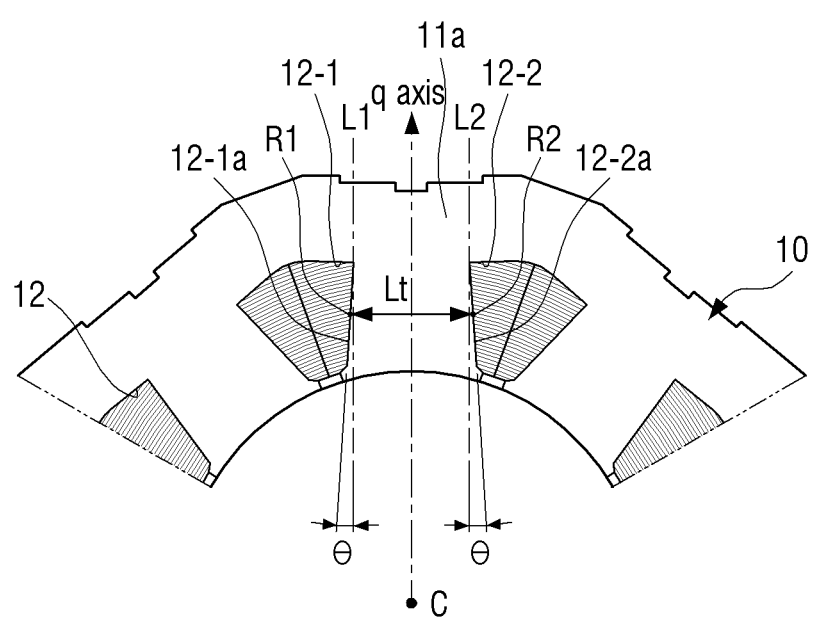
FIG. 4 is a partial cross-sectional view illustrating another example of a stator of an interior permanent magnet motor according to an embodiment of the present disclosure.

FIG. 4 is a partial cross-sectional view illustrating another example of a stator of an interior permanent magnet motor according to an embodiment of the present disclosure.

Referring to FIG. 4, the side surfaces 12-1a and 12-2a of the two adjacent coil grooves 12-1 and 12-2 of the plurality of coil grooves 12 are formed to be inclined at a predetermined angle θ with respect to the two straight lines L1 and L2 parallel to the q-axis. Here, the q-axis refers to a straight line passing through the middle of the two adjacent coil grooves 12-1 and 12-2 from the center C of the stator core 11. Accordingly, each of the plurality of stator teeth 11a formed by the plurality of coil grooves 12 is formed in a trapezoidal shape. At this time, the stator tooth width Lt is the distance between centers R1 and R2 of the side surfaces 12-1a and 12-2a of the two adjacent coil grooves 12-1 and 12-2.

The rotor 30 is rotatably disposed in the hollow 15 of the stator 10 and includes a plurality of permanent magnets 40 provided inside the rotor 30. In detail, the rotor 30 may include a rotor core 31 and the plurality of permanent magnets 40 disposed inside the rotor core 31. The plurality of permanent magnets 40 are provided such that two adjacent permanent magnets 40-1 and 40-2 have different magnetic poles so that the two adjacent permanent magnets 40-1 and 40-2 form a magnetic circuit. For example, as illustrated in FIG. 2, when the first permanent magnet 40-1 are arranged so that the magnetic flux flows outward from the center C of the rotor 30 as indicated by an arrow M1, the second permanent magnet 40-2 adjacent to the first permanent magnets 40-1 is arranged so that the magnetic flux flows from the outside to the center C of the rotor 30 as indicated by an arrow M2.

Although not illustrated, a shaft may be fixed to the center C of the rotor 30. Accordingly, when the rotor 30 rotates, the shaft may rotate integrally with the rotor 30.

Each of the plurality of permanent magnets 40 includes a central permanent magnet 41, and a pair of side permanent magnets 42 and 43 disposed at opposite ends of the central permanent magnets 41. The central permanent magnet 41 is disposed perpendicular to the d-axis passing through the center C of the rotor 30, and the center of the central permanent magnet 41 is located on the d-axis. Also, the thickness Tc of the central permanent magnet 41 is formed to be thicker than the thickness Tm of each of the pair of side permanent magnets 42 and 43. The pair of side permanent magnets 42 and 43 are disposed at the opposite ends of the central permanent magnet 41 to be inclined toward the outer circumferential surface of the rotor 30. In other words, the side permanent magnets 42 and 43 are disposed to be inclined upward with respect to the central permanent magnet 41.

A pair of bathers 50 is provided between the central permanent magnet 41 and the pair of side permanent magnets 42 and 43. For example, as illustrated in FIG. 3, a first bather 50-1 is provided between the left end of the central permanent magnet 41 and the first side permanent magnet 42 disposed on the left side of the central permanent magnet 41, and a second bather 50-2 is provided between the right end of the central permanent magnet 41 and the second permanent magnet 43 disposed on the right side of the central permanent magnet 41. At this time, the thickness (or height) Tb of each of the pair of bathers 50 may be formed to be equal to or greater than the thickness Tc of the central permanent magnet 41. The pair of bathers 50 may be formed of air or a non-magnetic material.

Further, the permanent magnets 40 may be formed to satisfy the following condition.

$$0.5 \times Lm \leq Lc \leq Lm$$

Here, Lc represents the shortest distance between the pair of side permanent magnets 42 and 43, and Lm represents the length of each of the side permanent magnets 42 and 43. In detail, referring to FIG. 3, Lc denotes a distance between a point P1 of the first side permanent magnet 42 and a point P2 of the second permanent magnet 43 that are closest to the d-axis. Accordingly, Lc is a length including the central permanent magnet 41 and portions of the pair of bathers 50.

Also, the two adjacent permanent magnets 40-1 and 40-2 are arranged to satisfy a predetermined relationship with the width Lt of the stator tooth 11a. In detail, the plurality of permanent magnets 40 are arranged so that the distance Lt between the two adjacent coil grooves 12-1 and 12-2 of the plurality of coil grooves 12 of the stator 10, that is, the stator teeth width which is the distance between the two adjacent coils 13 of the plurality of coils 13 disposed in the plurality of coil grooves 12 is greater than or equal to the distance Ls between two points P3 and P4 that are spaced farthest apart in the two adjacent side permanent magnets 43-1 and 42-2 of the pair of side permanent magnets 42 and 43 of each of the two adjacent permanent magnets 40-1 and 40-2 of the plurality of permanent magnets 40. At this time, the two points P3 and P4 of the two adjacent side permanent magnets 43-1 and 42-2 are points that are spaced farthest apart in the circumferential direction of the rotor 30 (direction of arrow H in FIG. 5).

Figure 5:
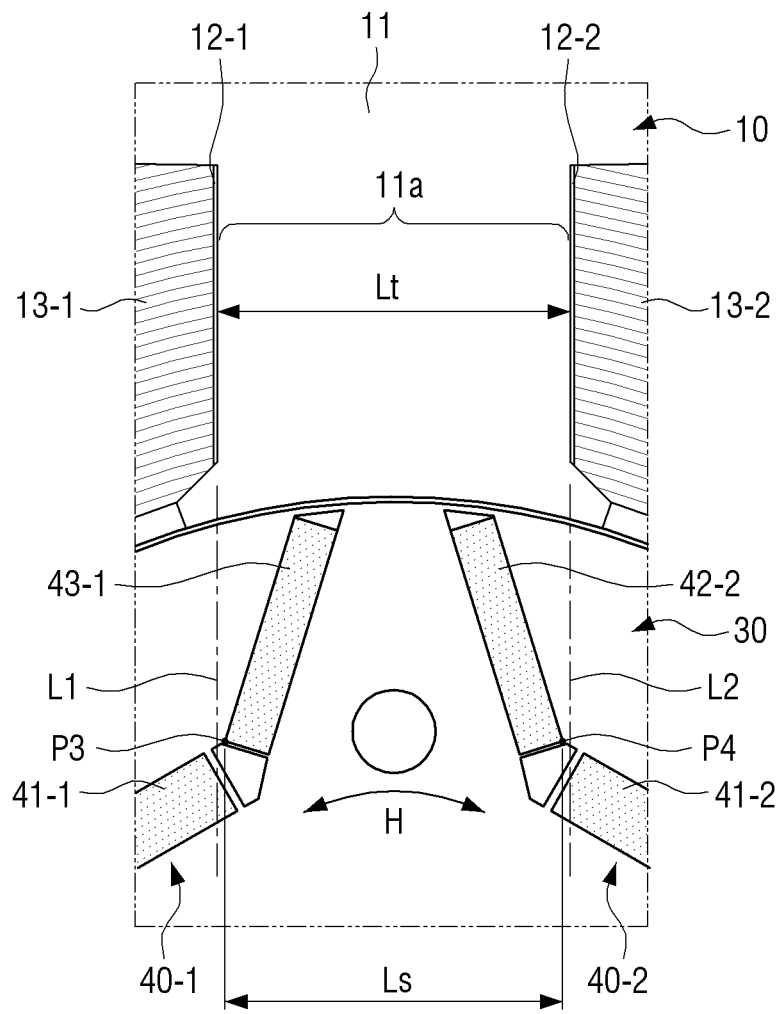
FIG. 5 is a view for explaining a relationship between a stator tooth width and a permanent magnet of an interior permanent magnet motor according to an embodiment of the present disclosure.

For example, referring to FIG. 5, the two adjacent permanent magnets 40-1 and 40-2 are so that the side permanent magnets 43-1 and 42-2 thereof are adjacent to each other. In detail, the right side permanent magnet 43-1 of the first permanent magnet 40-1 and the left side permanent magnet 42-2 of the second permanent magnet 40-2 are adjacent to each other. At this time, when two points that are spaced farthest apart in the circumferential direction of the rotor 30 in the right side permanent magnet 43-1 of the first permanent magnet 40-1 and the left side permanent magnet 42-2 of the second permanent magnet 40-2 are referred to as P3 and P4, respectively, the distance Ls between the two points P3 and P4 may be set to be equal to or smaller than the width Lt of the stator tooth 11a provided between the first coil 13-1 and the second coil 13-2. In other words, the plurality of permanent magnets 40 may be arranged so that the two adjacent side permanent magnets 43-1 and 42-2 of the two adjacent permanent magnets 40-1 and 40-2 are positioned within the stator teeth width Lt. Accordingly, any portion of the two adjacent side permanent magnets 43-1 and 42-2 does not deviate from the projection area of the stator tooth 11a, and all portions of the two side permanent magnets 43-1 and 42-2 is located within the projection area of the stator tooth 11a. For example, as illustrated in FIG. 5, the two permanent magnets 40-1 and 40-2 are provided so that the two points P3 and P4 that are spaced farthest apart in the two adjacent side permanent magnets 43-1 and 42-2 do not deviate from two straight lines L1 and L2 extending from the both side surfaces of the stator tooth 11a.

Figure 6:
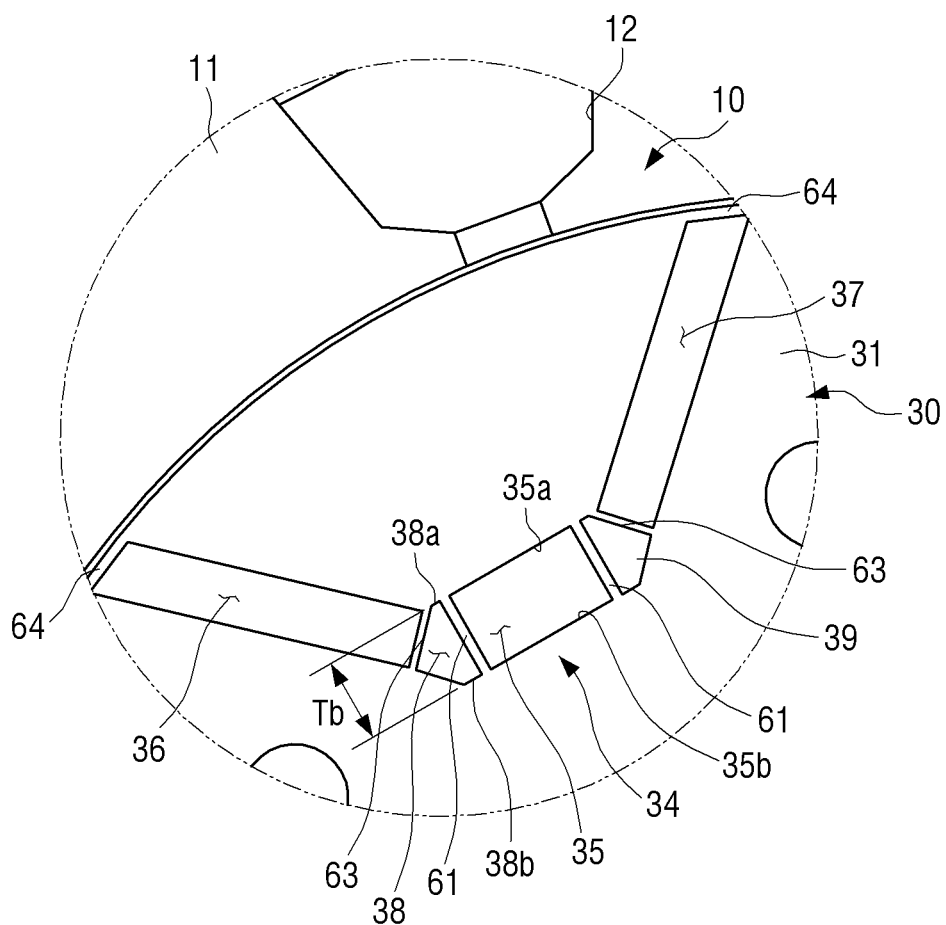
FIG. 6 is a view illustrating permanent magnet slots of a rotor of an interior permanent magnet motor according to an embodiment of the present disclosure.

The rotor core 31 is formed of a magnetic material and is provided with a plurality of permanent magnet slots 34 in which the plurality of permanent magnets 40 are disposed and a shaft hole 33 in which a shaft (not illustrated) is disposed. The plurality of permanent magnet slots 34 are formed at regular intervals in the circumferential direction around the shaft hole 33. The plurality of permanent magnets 40 is disposed in the plurality of permanent magnet slots 34, respectively. FIG. 6 illustrates the permanent magnet slots 34 in which the permanent magnets 40 are not disposed.

Referring to FIG. 6, the permanent magnet slots 34 includes a central slot 35 in which the central permanent magnet 41 is disposed, a pair of side slots 36 and 37 in which the pair of side permanent magnets 42 and 43 is disposed, and a pair of bather slots 38 and 39 in which the bathers 50 are disposed. The central slot 35 and the pair of bather slots 38 and 39 may be partitioned by fixing ribs 61. Further, the pair of bather slots 38 and 39 and the pair of side slots 36 and 37 may be partitioned by fixing ribs 63.

Referring to FIG. 3 again, the central permanent magnet 41 and the pair of side permanent magnets 42 and 43 are fixed by the fixing ribs 61, 63, and 64 provided in the rotor core 31. For example, the opposite ends of the central permanent magnet 41 are supported and fixed by a pair of central fixing ribs 61 provided in the permanent magnet slots 34. Further, the opposite ends of the side permanent magnets 42 and 43 are supported and fixed by the inner fixing ribs 63 formed in one side of the central fixing ribs 61 of the permanent magnet slots 34 and the outer fixing ribs 64 provided on the outer circumferential surface of the rotor core 31.

Figure 7:
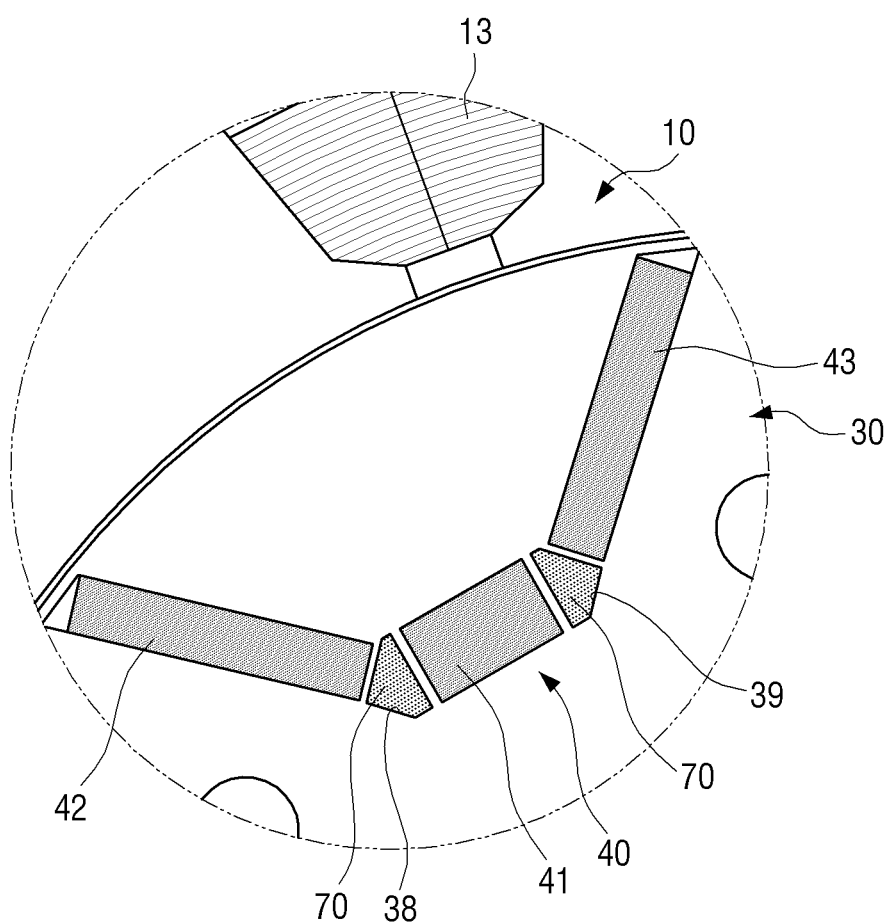
FIG. 7 is a view illustrating a case in which a bather of an interior permanent magnet motor according to an embodiment of the present disclosure is formed of a non-magnetic material.

The pair of bather slots 38 and 39 is provided at opposite ends of the central slot 35. The thickness Tb of the bather 50 is determined by the thickness of the bather slots 38 and 39. As illustrated in FIG. 6, the thickness Tb of the bather slots 38 and 39 refers to a distance between the both side surfaces 38a and 38b of the bather slots 38 and 39 parallel to the both side surfaces 35a and 35b of the central slot 35. The bather slots 38 and 39 may keep the interior empty as illustrated in FIG. 3. In this case, the air inside the bather slots 38 and 39 serves as the bather 50. As another embodiment, as illustrated in FIG. 7, a non-magnetic material 70 may be filled in the bather slots 38 and 39. As the non-magnetic material 70, a material such as plastic that is not affected by the magnetic field may be used. In this case, the non-magnetic material 70 filled in the bather slots 38 and 39 performs the function of the bather 50. The bathers 50 are formed between the central fixing rib 61 for supporting the central permanent magnet 41 and the inner fixing rib 63 for supporting the inside end of the side permanent magnets 42 and 43.

Since the central permanent magnet 41 and the pair of side permanent magnets 42 and 43 are fixed by the fixing ribs 61, 63, and 64 formed in the rotor core 31 as described above, the rigidity of the rotor 30 may be increased.

In the above description, the pair of central fixing ribs 61 is formed to connect both side surfaces of the central slot 35, but the shape of the central fixing rib 61 is not limited thereto. Hereinafter, various shapes of the pair of central fixing ribs 61 will be described with reference to FIGS. 8 to 10.

Figure 8:
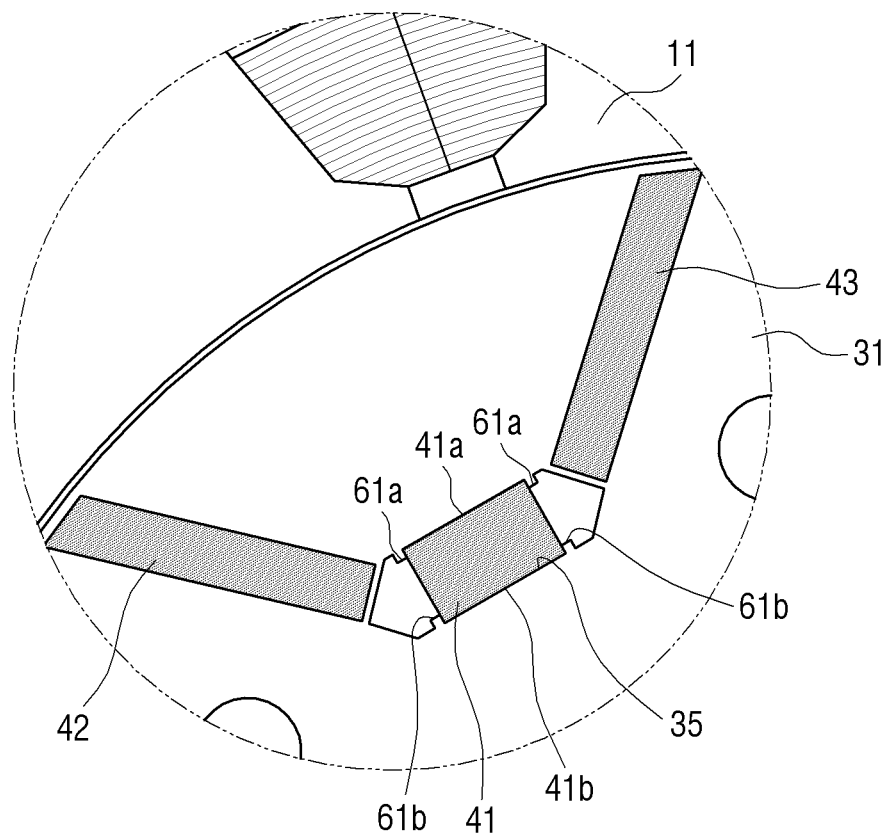
FIG. 8 is a partial cross-sectional view illustrating an example of fixing ribs to support a permanent magnet of an interior permanent magnet motor according to an embodiment of the present disclosure.

FIG. 8 is a partial cross-sectional view illustrating an example of fixing ribs to support a permanent magnet of an interior permanent magnet motor according to an embodiment of the present disclosure.

For example, as illustrated in FIG. 8, a pair of central fixing ribs may be formed in a protruding shape protruding from opposite sides of the central slot 35. In detail, two protrusions 61a formed on one side surface of the central slot 35 that supports the outer side 41a of the central permanent magnet 41 may be provided to support the opposite ends of the outer side 41a of the central permanent magnet 41. Further, two protrusions 61b formed on the other side surface of the central slot 35 that supports the inner side 41b of the central permanent magnet 41 may be provided to support the opposite ends of the inner side 41b of the central permanent magnet 41.

Figure 9:
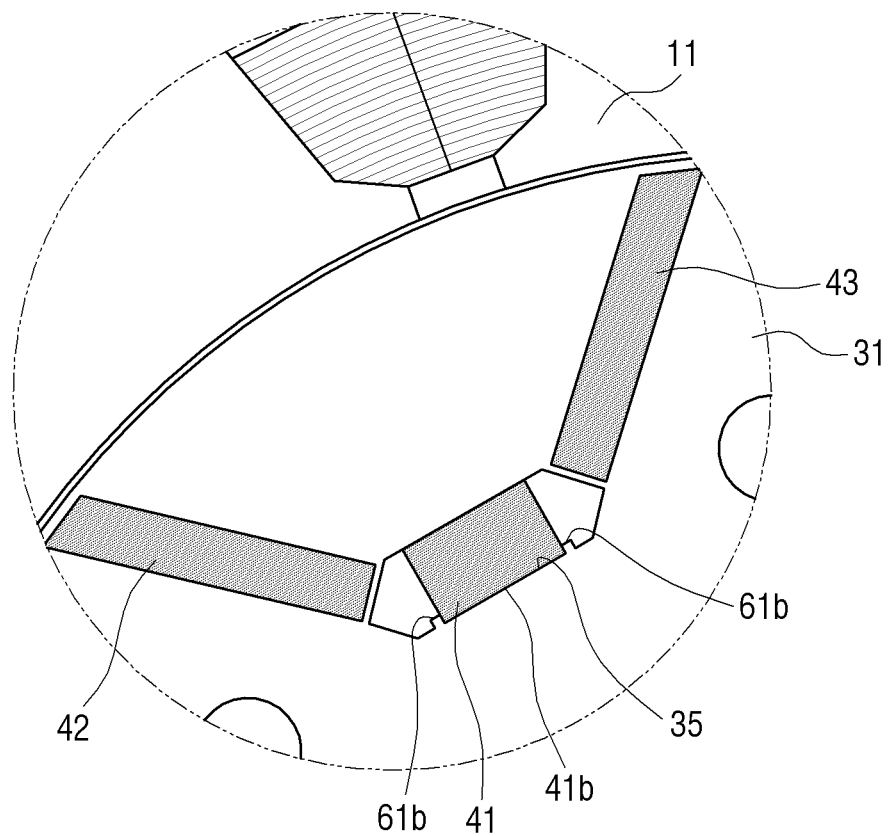
FIG. 9 is a partial cross-sectional view illustrating another example of fixing ribs to support a permanent magnet of an interior permanent magnet motor according to an embodiment of the present disclosure.

FIG. 9 is a partial cross-sectional view illustrating another example of fixing ribs to support a permanent magnet of an interior permanent magnet motor according to an embodiment of the present disclosure.

Referring to FIG. 9, the pair of central fixing ribs 61 may be formed in a protruding shape protruding from one side surface of the central slot 35 that supports the inner side 41b of the central permanent magnet 41. In other words, two protrusions 61b formed on one side surface of the central slot 35 that supports the inner side 41b of the central permanent magnet 41 may be provided to support the opposite ends of the inner side 41b of the central permanent magnet 41.

Figure 10:
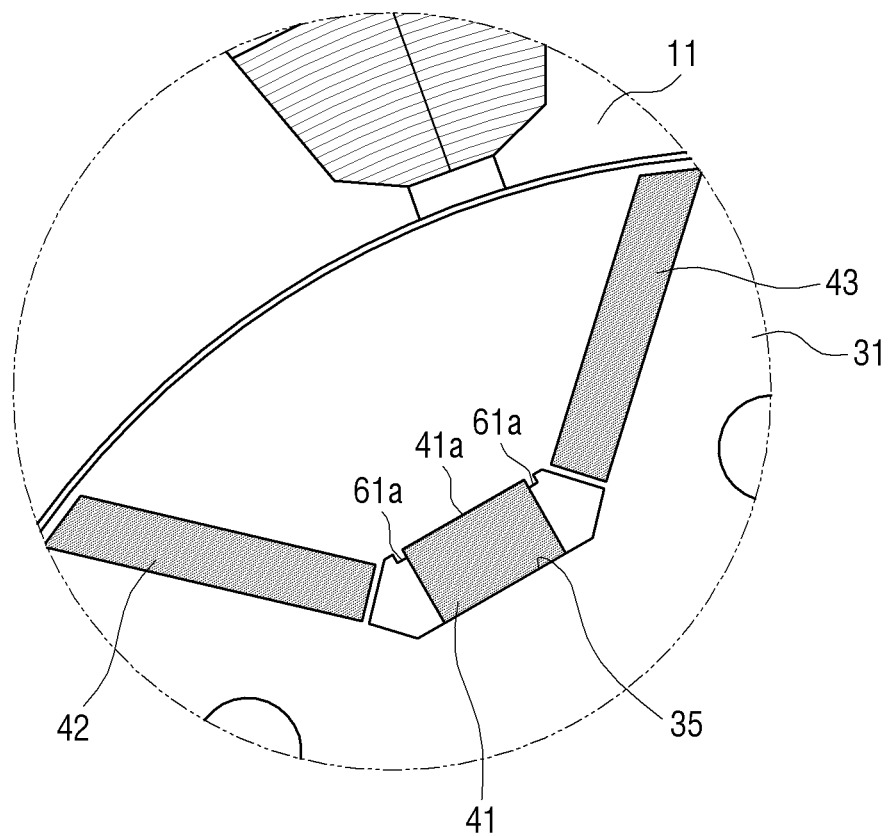
FIG. 10 is a partial cross-sectional view illustrating still another example of fixing ribs to support a permanent magnet of an interior permanent magnet motor according to an embodiment of the present disclosure.

FIG. 10 is a partial cross-sectional view illustrating still another example of fixing ribs to support a permanent magnet of an interior permanent magnet motor according to an embodiment of the present disclosure.

Referring to FIG. 10, the pair of central fixing ribs may be formed in a protruding shape protruding from one side surface of the central slot 35 that supports the outer side 41a of the central permanent magnet 41. In other words, two protrusions 61a formed on one side surface of the central slot 35 that supports the outer side 41a of the central permanent magnet 41 may be provided to support the opposite ends of the outer side 41a of the central permanent magnet 41.

Although not illustrated, the inner fixing ribs 63 for supporting the pair of side permanent magnets 42 and 43 may be formed in a protruding shape like the central fixing ribs 61a and 61b.

In the magnetic circuit, since the permanent magnets 40 and the bathers 50 serve as magnetic reluctance, when the thickness thereof is increased, the amount of magnetic flux passing through the permanent magnets 40 and the bathers 50 is reduced so that the inductance is reduced. Accordingly, as described above, when the thickness Tc and Tb of the permanent magnets 40 and the bathers 50 placed in the magnetic circuit passage in the d-axis direction are increased, the d-axis inductance of the magnetic flux decreases. Further, when the relationship between the stator teeth width Lt and the side permanent magnets of the two adjacent permanent magnets 40 is formed as described above, there is no change in the q-axis inductance. Therefore, the saliency ratio S calculated by the ratio of the q-axis inductance and the d-axis inductance, that is, $S=Lq/Ld$ is improved.

In the above description, the permanent magnets 40 include one central permanent magnet 41. However, the shape of the central permanent magnet 41 is not limited thereto. The central permanent magnet may be formed to include two or more central permanent magnets arranged in the d-axis direction.

Hereinafter, an interior permanent magnet motor according to an embodiment of the present disclosure in which a permanent magnet includes two or more central permanent magnets will be described with reference to FIGS. 11 and 12.

Figure 11:
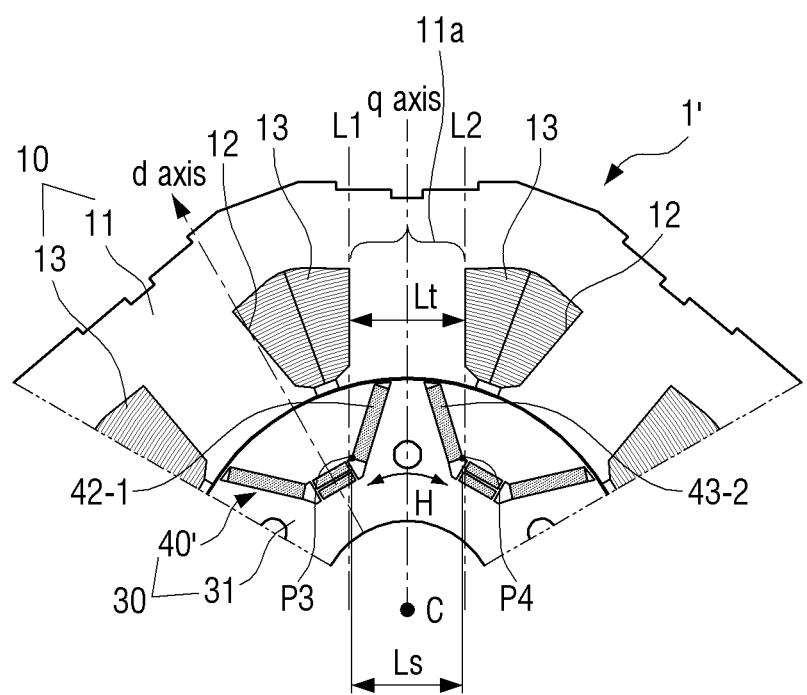
FIG. 11 is a partial cross-sectional view illustrating an interior permanent magnet motor according to an embodiment of the present disclosure in which another example of permanent magnets are used.
Figure 12:
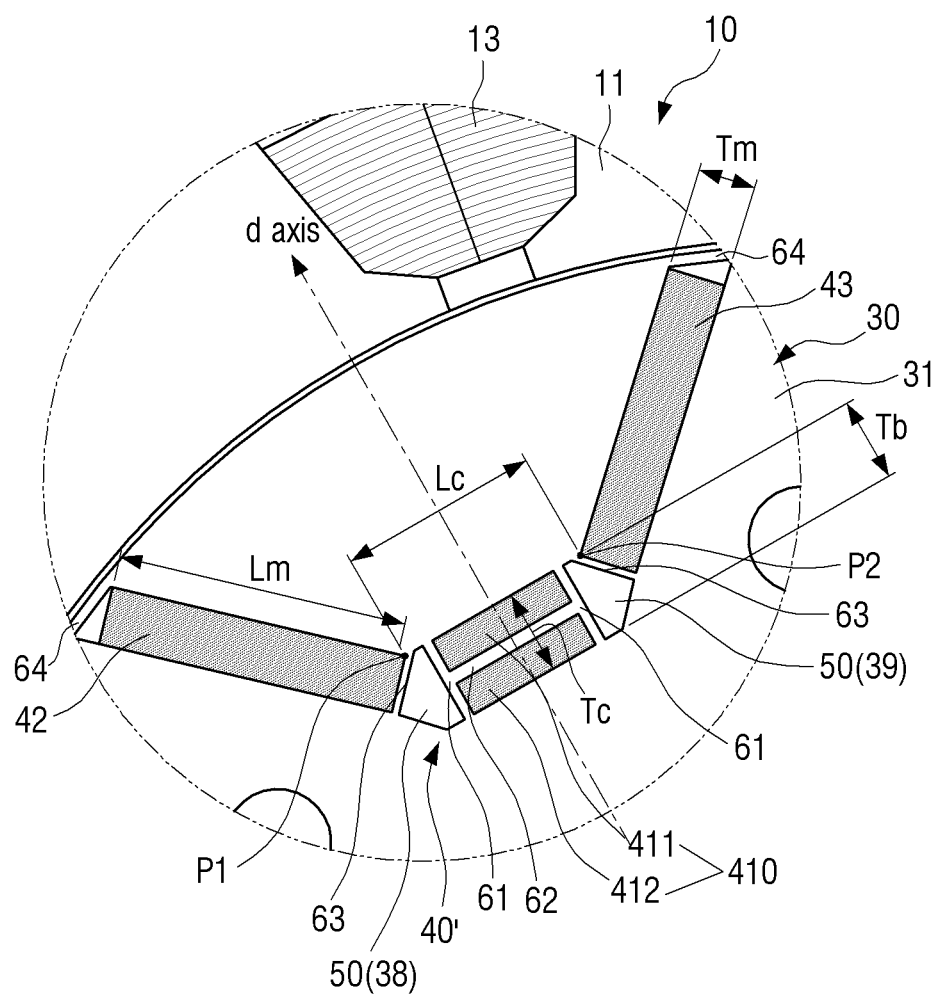
FIG. 12 is a partial enlarged cross-sectional view illustrating a permanent magnet of FIG. 11.

FIG. 11 is a partial cross-sectional view illustrating an interior permanent magnet motor according to an embodiment of the present disclosure in which another example of permanent magnets are used, and FIG. 12 is a partial enlarged cross-sectional view illustrating a permanent magnet of FIG. 11.

Referring to FIG. 11, an interior permanent magnet motor 1' according to an embodiment of the present disclosure may include a stator 10 and a rotor 30.

The stator 10 includes a stator core 11 and a plurality of coils 13. The stator core 11 and the plurality of coils 13 are the same as or similar to those of the stator 10 of the interior permanent magnet motor 1 according to the above-described embodiment; therefore, detailed descriptions thereof are omitted.

The rotor 30 is rotatably disposed in a hollow (e.g. hollow 15) of the stator 10, and includes a rotor core 31 and a plurality of permanent magnets 40' disposed inside the rotor core 31. Although not illustrated, a shaft may be fixed to the center of the rotor 30. Accordingly, when the rotor 30 rotates, the shaft may rotate integrally with the rotor 30.

Referring to FIG. 12, each of the plurality of permanent magnets 40' includes a central permanent magnet 410, and a pair of side permanent magnets 42 and 43 disposed at opposite ends of the central permanent magnet 410.

The central permanent magnet 410 is disposed perpendicular to the d-axis passing through the center C of the rotor 30, and the center of the central permanent magnet 410 is positioned on the d-axis. The central permanent magnet 410 may include two or more central permanent magnets 411 and 412 unlike the central permanent magnet 41 of the above-described embodiment. For example, as illustrated in FIGS. 11 and 12, the central permanent magnet 410 may include a first central permanent magnet 411 and a second central permanent magnet 412 arranged in parallel to each other. The first central permanent magnet 411 and the second central permanent magnet 412 are spaced apart from each other in the d-axis direction. A middle rib 62 may be provided between the first central permanent magnet 411 and the second central permanent magnet 412. At this time, the total thickness Tc of the first and second central permanent magnets 411 and 412, that is, the sum of the thickness of the first central permanent magnet 411, the thickness of the middle rib 62, and the thickness of the second central permanent magnet 412 is formed to be thicker than the thickness Tm of the pair of the side permanent magnets 42 and 43.

The pair of side permanent magnets 42 and 43 is provided at the opposite ends of the central permanent magnet 410 to be inclined toward the outer circumferential surface of the rotor 30. In other words, the side permanent magnets 42 and 43 are disposed to be inclined upward with respect to the central permanent magnet 410. The thickness Tm of each of the side permanent magnets 42 and 43 is formed to be thinner than the total thickness Tc of the first and second central permanent magnets 411 and 412.

A pair of bathers 50 is provided between the first and second central permanent magnets 411 and 412 and the pair of side permanent magnets 42 and 43. For example, as illustrated in FIG. 12, a first bather 50 is provided between the left ends of the first and second central permanent magnets 411 and 412 and the left side permanent magnet 42 disposed on the left side of the first and second central permanent magnets 411 and 412, and a second bather 50 is provided between the right ends of the central permanent magnets 411 and 412 and the right side permanent magnet 43 disposed on the right side of the first and second central permanent magnets 411 and 412. At this time, the thickness (or height) Tb of each of the pair of bathers 50 may be formed to be equal to or greater than the total thickness Tc of the first and second central permanent magnets 411 and 412. The pair of bathers 50 may be formed of air or a non-magnetic material filled in a pair of bather slots formed in the rotor core 31.

Further, the plurality of permanent magnets 40' of the interior permanent magnet motor 1' according to the present embodiment may be formed to satisfy the following condition in the same manner as the permanent magnets 40 of the interior permanent magnet motor 1 according to the above-described embodiment.

$$0.5 \times Lm \leq Lc \leq Lm$$

Here, Lc represents the shortest distance between the pair of side permanent magnets 42 and 43, and Lm represents the length of each of the side permanent magnets 42 and 43. In detail, referring to FIG. 12, Lc denotes a distance between a point P1 of the first side permanent magnet 42 and a point P2 of the second permanent magnet 43 that are closest to the d-axis. Accordingly, Lc is a length including the central permanent magnet 410 and portions of the pair of bathers 50.

Also, the plurality of permanent magnets 40' according to the present embodiment are arranged so that two adjacent permanent magnets 40' satisfy a predetermined relationship with the stator tooth width Lt like the plurality of permanent magnets 40 of the interior permanent magnet motor 1 according to the above-described embodiment. In detail, the plurality of permanent magnets 40' are arranged so that the distance between the two adjacent coil grooves 12 of the plurality of coil grooves 12 of the stator 10, that is, the stator tooth width Lt which is the distance between the two adjacent coils 13 of the plurality of coils 13 disposed in the plurality of coil grooves 12 is greater than the distance Ls between the two points P3 and P4 of the two adjacent side permanent magnets 43-1 and 42-2 of the pair of side permanent magnets 42 and 43 of each of the two adjacent permanent magnets 40' of the plurality of permanent magnets 40' which are spaced farthest apart in the circumferential direction of the rotor 30 (see the direction of arrow H in FIG. 11).

In other words, in FIG. 11, the plurality of permanent magnets 40' may be arranged so that the two adjacent side permanent magnets 43-1 and 42-2 of the two adjacent permanent magnets 40' are positioned within the stator tooth 11a. Accordingly, any portion of the two adjacent side permanent magnets 43-1 and 42-2 does not deviate from the projection area of the stator tooth 11a, and all portions of the two adjacent side permanent magnets 43-1 and 42-2 is located within the projection area of the stator tooth 11a. For example, as illustrated in FIG. 11, the plurality of permanent magnets 40' are provided so that the two points P3 and P4 which are spaced farthest apart from the q-axis in the two adjacent side permanent magnets 43-1 and 42-2 of the two adjacent permanent magnets 40' do not deviate from two straight lines L1 and L2 extending from the both side surfaces of the stator tooth 11a.

Figure 13:
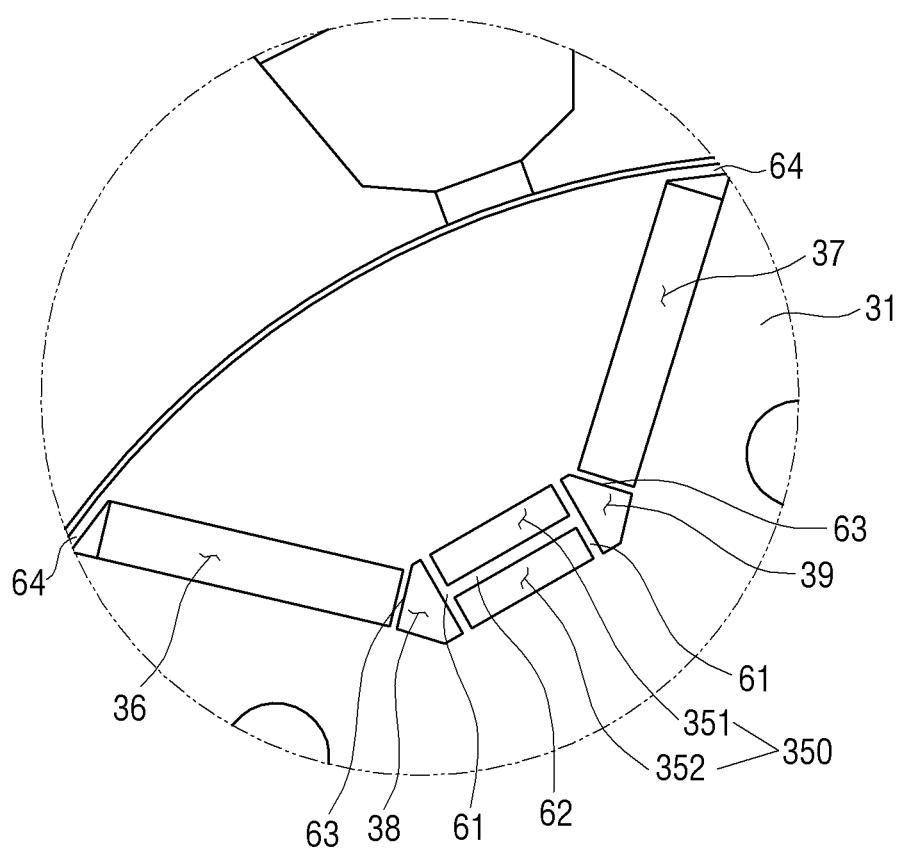
FIG. 13 is a partial enlarged cross-sectional view illustrating a permanent magnet slot of FIG. 12 when the permanent magnet is not disposed.

The rotor core 31 is formed of a magnetic material and is provided with a plurality of permanent magnet slots 34' in which the plurality of permanent magnets 40' are disposed and a shaft hole (not illustrated) in which a shaft (not illustrated) is disposed. The plurality of permanent magnet slots 34' are formed at regular intervals in the circumferential direction around the shaft hole. The plurality of permanent magnets 40' is disposed in the plurality of permanent magnet slots 34', respectively. FIG. 13 is a partial enlarged cross-sectional view illustrating a permanent magnet slot of FIG. 12 in which the permanent magnets 40' are not disposed.

Referring to FIG. 13, the permanent magnet slots 34' includes a central slot 350 in which the central permanent magnet 410 is disposed, a pair of side slots 36 and 37 in which the pair of side permanent magnets 42 and 43 are disposed, and a pair of bather slots 38 and 39 in which the bathers 50 are disposed.

The central slot 350 includes two slots 351 and 352 which are overlapped in the d-axis direction by the middle rib 62. In other words, the central slot 350 includes a first central slot 351 and a second central slot 352 parallel to each other. The central slot 350 and the pair of bather slots 38 and 39 may be partitioned by a pair of central fixing ribs 61. Further, the pair of bather slots 38 and 39 and the pair of side slots 36 and 37 may be partitioned by inner fixing ribs 63.

Accordingly, the two central permanent magnets 411 and 412 are inserted into and fixed to the first central slot 351 and the second central slot 352. In other words, the first central permanent magnet 411 and second central permanent magnet 412 are supported and fixed by the pair of central fixing ribs 61 and the middle rib 62 connecting the pair of central fixing ribs 61 that are provided in the permanent magnet slots 34'. Further, the opposite ends of the side permanent magnets 42 and 43 are supported and fixed by the inner fixing ribs 63 formed in one side of the central fixing ribs 61 of the permanent magnet slots 34' and the outer fixing ribs 64 provided on the outer circumferential surface of the rotor core 31.

The pair of bather slots 38 and 39 is provided at opposite ends of the central slot 350. As illustrated in FIG. 12, the bather slots 38 and 39 may be kept empty so that the air inside the bather slots 38 and 39 functions as the bather. As another embodiment, a non-magnetic material may be filled in the bather slots 38 and 39 so that the non-magnetic material functions as the bather. As the non-magnetic material, a material such as plastic that is not affected by the magnetic field may be used.

The plurality of permanent magnets 40' as described above are disposed such that the direction of the lines of the magnetic force of two adjacent permanent magnets 40' are opposite to each other. Therefore, the two adjacent permanent magnets 40' form a magnetic circuit.

In FIGS. 11 and 12, the central permanent magnet 410 includes two central permanent magnets 411 and 412; however, the structure of the central permanent magnet 410 is not limited thereto. The central permanent magnet 410 may be formed so that three or more central permanent magnets are overlapped parallel to each other in the d-axis direction.

Hereinafter, the performance of an interior permanent magnet motor according to an embodiment of the present disclosure having the above-described structure will be described in comparison with the conventional interior permanent magnet motor.

Figure 14A:
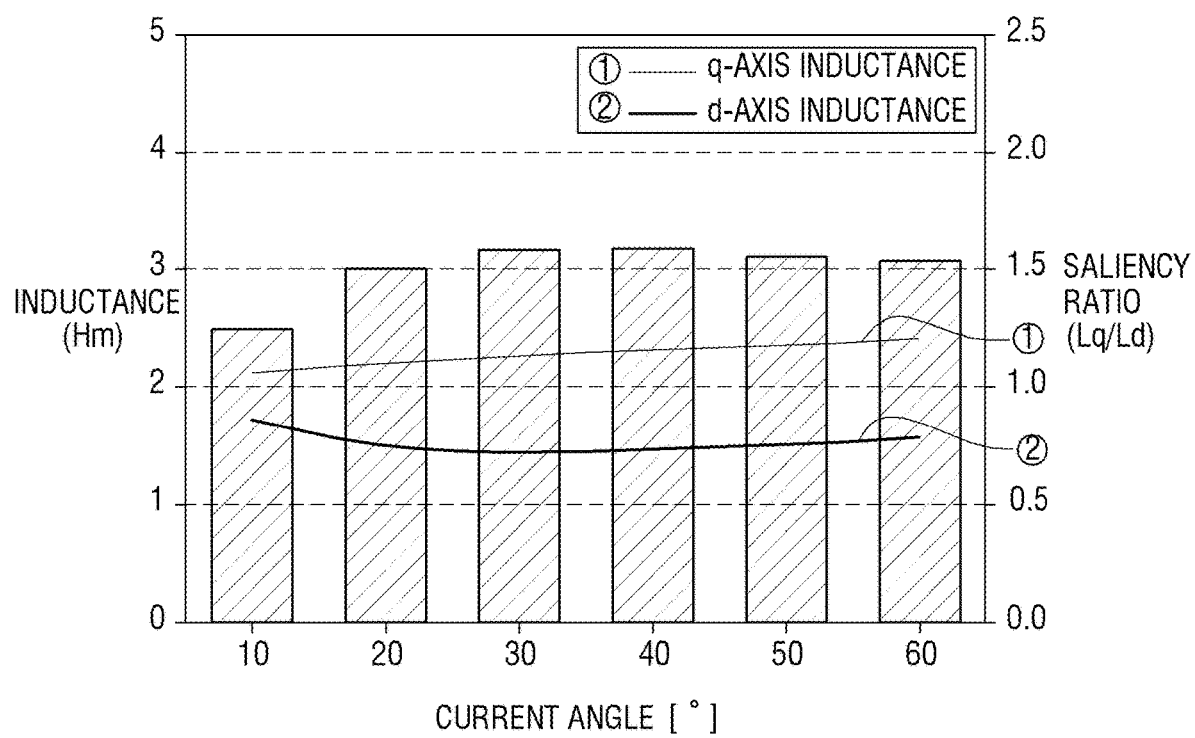
FIG. 14A is a graph illustrating inductance and saliency ratio of a conventional interior permanent magnet motor.
Figure 14B:
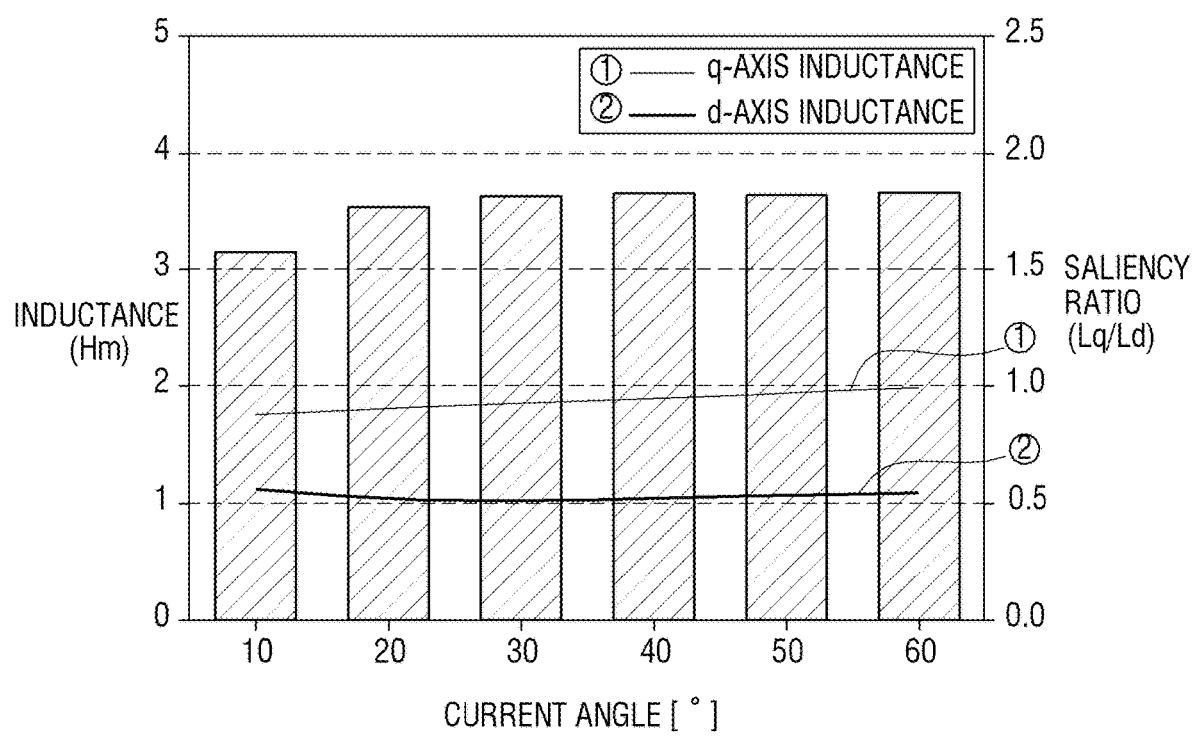
FIG. 14B is a graph illustrating inductance and saliency ratio of an interior permanent magnet motor according to an embodiment of the present disclosure.

FIG. 14A is a graph illustrating inductance and saliency ratio of a conventional interior permanent magnet motor, and FIG. 14B is a graph illustrating inductance and saliency ratio of an interior permanent magnet motor according to an embodiment of the present disclosure.

In FIGS. 14A and 14B, a horizontal axis represents a current angle, and a vertical axis represents inductance and saliency ratio. Line ① represents q-axis inductance, and line ② represents d-axis inductance. In addition, six bars represent the saliency ratio at various current angles.

Referring to FIGS. 14A and 14B, it may be seen that the saliency ratio of the interior permanent magnet motor 1 according to an embodiment of the present disclosure is larger than the saliency ratio of the conventional interior permanent magnet motor. For example, when the current angle is approximately 60 degrees, the saliency ratio of the conventional interior permanent magnet motor is about 1.52, while the saliency ratio of the interior permanent magnet motor according to an embodiment of the present disclosure is about 1.83 so that the saliency ratio is improved. In particular, it can be seen from FIGS. 14A and 14B that the d-axis inductance of the interior permanent magnet motor according to an embodiment of the present disclosure is smaller than the d-axis inductance of the conventional interior permanent magnet motor.

Figure 15:
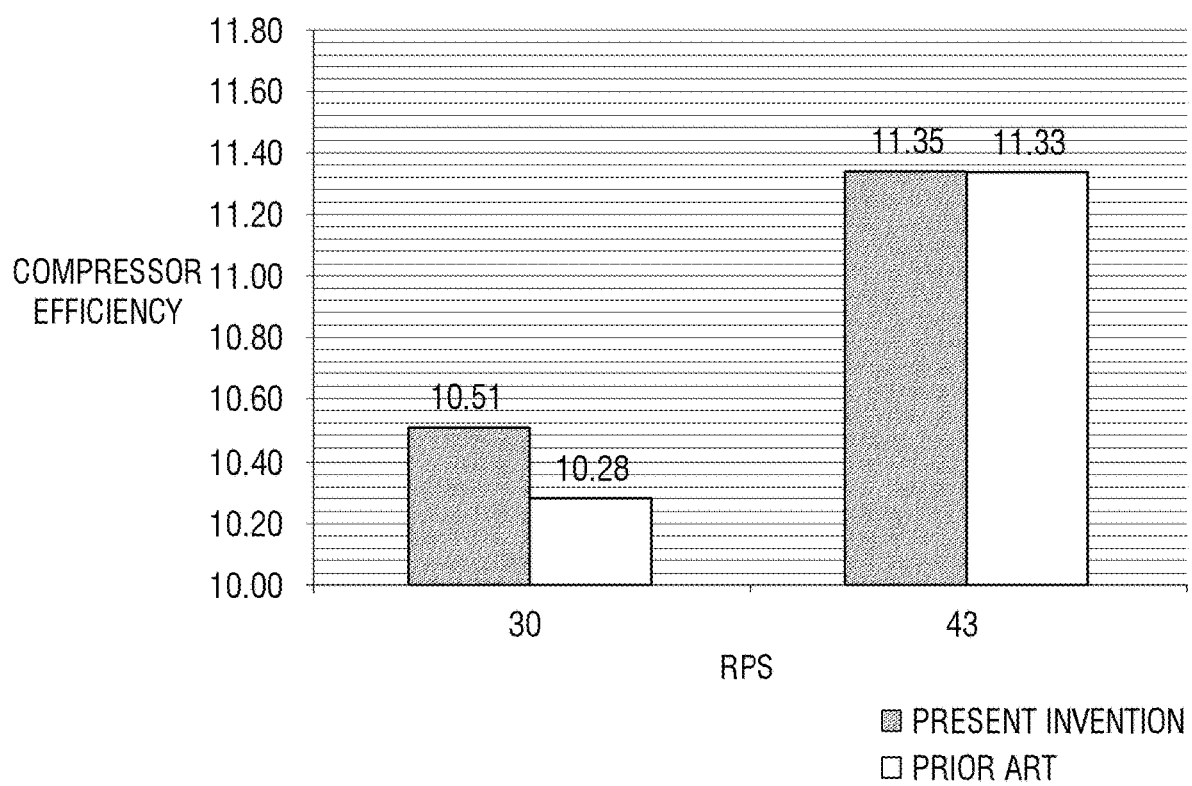
FIG. 15 is a graph comparing efficiencies of a compressor using a conventional interior permanent magnet motor and a compressor using an interior permanent magnet motor according to an embodiment of the present disclosure.

FIG. 15 is a graph comparing efficiencies of a compressor using a conventional interior permanent magnet motor and a compressor using an interior permanent magnet motor according to an embodiment of the present disclosure. At this time, the interior permanent magnet motor is used as a driving source for driving the compressor.

In FIG. 15, a horizontal axis represents revolutions per second (RPS) of the interior permanent magnet motor, and a vertical axis represents efficiency of the compressor.

Referring to FIG. 15, when the revolutions per second of the interior permanent magnet motor is 30 RPS, the efficiency of the compressor using the conventional interior permanent magnet motor is about 10.28, but the efficiency of the compressor using the interior permanent magnet motor according to an embodiment of the present disclosure is about 10.51. Accordingly, it can be seen that the efficiency of the compressor is improved. In other words, it can be seen that the low-speed efficiency of the interior permanent magnet motor according to an embodiment of the present disclosure is improved.

Figure 16:
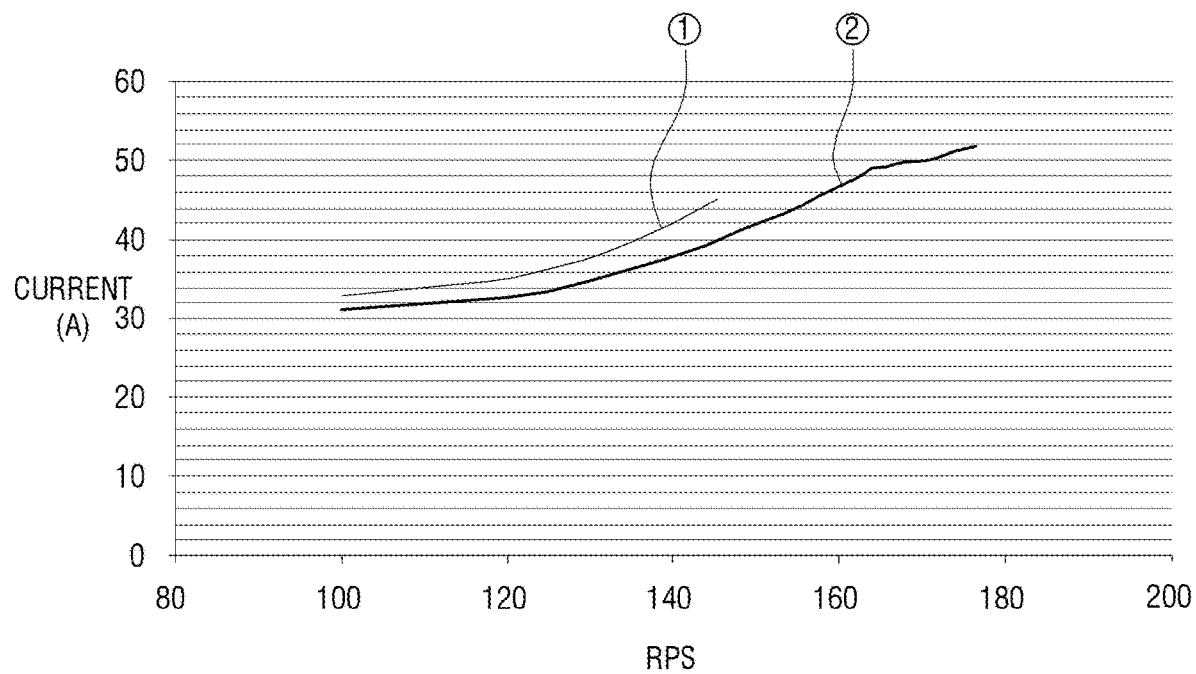
FIG. 16 is a graph comparing input current and operation ranges of a compressor using a conventional interior permanent magnet motor and a compressor using an interior permanent magnet motor according to an embodiment of the present disclosure.

FIG. 16 is a graph comparing input current and operation ranges of a compressor using a conventional interior permanent magnet motor and a compressor using an interior permanent magnet motor according to an embodiment of the present disclosure.

In FIG. 16, a horizontal axis represents revolutions per second (RPS) of the interior permanent magnet motor, and a vertical axis represents input current of the compressor. Also, line ① represents the compressor using the conventional interior permanent magnet motor, and line ② represents the compressor using an interior permanent magnet motor according to an embodiment of the present disclosure.

Referring to FIG. 16, the operation range of the compressor using the conventional interior permanent magnet motor is in the range of about 100 RPS to about 146 RPS, but the operation range of the compressor using the interior permanent magnet motor according to an embodiment of the present disclosure is in the range of about 100 RPS to about 176 RPS. Therefore, it can be seen that the operation range is widened. Further, it can be seen that the input current of the compressor using the interior permanent magnet motor according to an embodiment of the present disclosure is lowered in the same operation range. For example, when the revolutions per second of the interior permanent magnet motor is 140 RPS, the input current of the compressor using the conventional interior permanent magnet motor is about 41 A, but the input current of the compressor using the interior permanent magnet motor according to an embodiment of the present disclosure is about 37 A. Therefore, it can be seen that the input current of the compressor is lowered.

The interior permanent magnet motor according to an embodiment of the present disclosure having the above-described structure may improve the saliency ratio by reducing the d-axis inductance. Therefore, the interior permanent magnet motor according to an embodiment of the present disclosure may improve the low-speed efficiency, reduce the input current, and enlarge the operation range.

While the embodiments of the present disclosure have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concepts.

What is claimed is:

1. An interior permanent magnet motor comprising:
a stator comprising a hollow and a plurality of coils provided around the hollow; and
a rotor rotatably disposed in the hollow of the stator, the rotor comprising a plurality of permanent magnet groups,
each of the plurality of permanent magnet groups of the rotor including:
a central permanent magnet part;
a pair of side permanent magnets, each side permanent magnet of the pair of side permanent magnets provided at respective opposite sides of the central permanent magnet part, each side permanent magnet to be angled upward toward an outer circumferential surface of the rotor; and
a pair of barriers, each barrier of the pair of barriers provided between the central permanent magnet part and each side permanent magnet, respectively, wherein a distance between two adjacent coils from among the plurality of coils of the stator is greater than a farthest distance between two adjacent side permanent magnets of a pair of side permanent magnets of each of two adjacent permanent magnet groups, from among the plurality of permanent magnet groups,
wherein:
a thickness of each of the pair of barriers is equal to or greater than a thickness of the central permanent magnet part, and
the thickness of the central permanent magnet part is greater than a thickness of each side permanent magnet, and
wherein the pair of barriers and the central permanent magnet part are partitioned by fixing ribs,
wherein each distance between two adjacent coils from among the plurality of coils of the stator is greater than all distances between the two adjacent side permanent magnets of a pair of side permanent magnet groups.

2. The interior permanent magnet motor of claim 1, wherein
each of the plurality of permanent magnet groups of the rotor is formed to satisfy a following condition:

$$0.5 \times Lm \leq Lc \leq Lm$$

wherein
Lc represents a shortest distance between each side permanent magnet of the pair of side permanent magnets, and
Lm represents a length of each side permanent magnet of the pair of side permanent magnets.

3. The interior permanent magnet motor of claim 1, wherein
the central permanent magnet part includes at least two central permanent magnets that are parallel to each other and perpendicular to a d-axis passing through a center of the rotor and a center of the central permanent magnet part.

4. The interior permanent magnet motor of claim 1, wherein
the pair of barriers are formed of a non-magnetic material.

5. The interior permanent magnet motor of claim 1, wherein
the plurality of permanent magnet groups are provided so that directions magnetic force fields of two adjacent permanent magnet groups from among the plurality of permanent magnet groups are opposite to each other.

6. The interior permanent magnet motor of claim 1, wherein
the central permanent magnet part is fixed by a pair of central fixing ribs provided in the rotor.

7. The interior permanent magnet motor of claim 6, wherein
the pair of central fixing ribs comprise protrusions to support opposite ends of any one of an inner side and an outer side of the central permanent magnet part.

8. The interior permanent magnet motor of claim 6, wherein
an inner end of each side permanent magnet of the pair of side permanent magnets is fixed by an inner fixing rib provided in the rotor.

9. The interior permanent magnet motor of claim 8, wherein
each barrier of the pair of barriers is formed between the central fixing rib and the inner fixing rib.

10. The interior permanent magnet motor of claim 1, wherein
side surfaces of two adjacent coils from among the plurality of coils are parallel to each other.

11. An interior permanent magnet motor comprising:
a stator comprising a hollow and a plurality of coils provided around the hollow; and
a rotor rotatably disposed in the hollow of the stator, the rotor comprising a plurality of permanent magnet groups,
each of the plurality of permanent magnet groups of the rotor including:
a central permanent magnet part;
a pair of side permanent magnets, each side permanent magnet of the pair of side permanent magnets provided at respective opposite sides of the central permanent magnet part, each side permanent magnet to be angled upward toward an outer circumferential surface of the rotor; and
a pair of barriers, each barrier of the pair of barriers provided between the central permanent magnet part and each side permanent magnet respectively, wherein a distance between two adjacent coils from among the plurality of coils of the stator is greater than a farthest distance between two adjacent side permanent magnets of a pair of side permanent magnet groups, from each of two adjacent permanent magnets of the plurality of permanent magnet groups, and
wherein each distance between the two adjacent coils from among the plurality of coils of the stator is greater than all distances between the two adjacent side permanent magnets of a pair of side permanent magnet groups.

12. The interior permanent magnet motor of claim 11, wherein a thickness of the central permanent magnet part is thicker than a thickness of each side permanent magnet of the pair of side permanent magnets.

13. The interior permanent magnet motor of claim 12, wherein
a thickness of each barrier of the pair of barriers is equal to or thicker than the thickness of the central permanent magnet part.

14. The interior permanent magnet motor of claim 11, wherein
each of the plurality of permanent magnet groups of the rotor is formed to satisfy a following condition, $$0.5 \times Lm \leq Lc \leq Lm$$

wherein
Lc represents a shortest distance between each permanent magnet of the pair of side permanent magnets, and
Lm represents a length of each side permanent magnet of the pair of side permanent magnets.

15. The interior permanent magnet motor of claim 11, wherein
the central permanent magnet part includes at least two central permanent magnets that are parallel to each other and perpendicular to a d-axis passing through a center of the rotor and a center of the central permanent magnet part.

16. The interior permanent magnet motor of claim 11, wherein
the central permanent magnet part is fixed by a pair of central fixing ribs provided in the rotor.

17. The interior permanent magnet motor of claim 16, wherein
an inner end of each side permanent magnet of the pair of side permanent magnets is fixed by an inner fixing rib provided in the rotor.

18. The interior permanent magnet motor of claim 17, wherein
each barrier of the pair of barriers is formed between the central fixing rib and the inner fixing rib.

* * * * *